ured Patent

United States Patent [19]

Iwase et al.

[11] Patent Number: 5,242,716
[45] Date of Patent: Sep. 7, 1993

[54] BARRIER COATING PROCESS USING OLEFIN RESIN AND URETHANE RESIN

[75] Inventors: Osamu Iwase; Yasuhiro Fujii; Tuguo Nezu, all of Hiratsuka, Japan

[73] Assignee: Kansai Paint Co., Ltd., Amagasaki, Japan

[21] Appl. No.: 750,483

[22] Filed: Aug. 27, 1991

[30] Foreign Application Priority Data

Aug. 31, 1990 [JP] Japan ................. 2-232229
Sep. 12, 1990 [JP] Japan ................. 2-241582

[51] Int. Cl.⁵ ............................................. B05D 1/36
[52] U.S. Cl. .............................. 427/407.1; 427/409; 427/412.1; 427/412.3; 427/327
[58] Field of Search ............ 427/410, 412.3, 327, 427/409, 407.1, 412.1

[56] References Cited

U.S. PATENT DOCUMENTS

| | | | |
|---|---|---|---|
| 4,113,539 | 9/1978 | Hotta et al. | 427/388.1 |
| 4,232,086 | 11/1980 | Mori et al. | 427/375 |
| 4,755,434 | 7/1988 | Fujii et al. | 427/407.1 |
| 4,756,975 | 7/1988 | Fujii et al. | 427/407.1 |
| 4,761,212 | 8/1988 | Watanabe et al. | 427/407.1 |
| 4,769,413 | 9/1988 | Fleming et al. | 524/507 |
| 4,789,566 | 12/1988 | Tatsuno et al. | 427/407.1 |
| 4,883,834 | 11/1989 | Yamamoto et al. | 524/504 |
| 4,888,244 | 12/1989 | Masubuchi et al. | 427/410 |
| 4,909,915 | 3/1990 | Bederke et al. | 204/181.4 |
| 4,977,207 | 12/1990 | Hoefer et al. | 524/839 |
| 5,011,733 | 4/1991 | Hiraki et al. | 427/410 |
| 5,039,731 | 8/1991 | Warren et al. | 524/507 |
| 5,047,294 | 9/1991 | Schwab et al. | 427/407.1 |

*Primary Examiner*—Shrive Beck
*Assistant Examiner*—Diana Dudash
*Attorney, Agent, or Firm*—Wenderoth, Lind & Ponack

[57] ABSTRACT

A process for coating a surface of a substrate containing a metallic member, which comprises first coating a cationic electrodeposition coating paint on the metallic member, then integrating the coated metallic member with a plastic member if required, coating an aqueous barrier coat composed mainly of a composition comprising an olefin resin and a urethane resin, further coating an intermediate coating paint if required, and thereafter coating a top coating paint.

28 Claims, No Drawings

BARRIER COATING PROCESS USING OLEFIN RESIN AND URETHANE RESIN

This invention relates to a process for coating metallic substrate. More particularly, this invention relates to a process for coating a metallic substrate such as, for example, a substrate composed only of a steel or composed of a steel and plastics constituting automotive bodies to form thereon a composite coating film excellent in chipping resistance, corrosion resistance, weather resistance and other physical properties.

Recently in the field of coating, there has come to be taken up more seriously the durability of the coating film on automotive outer bodies, particularly, the progress of corrosion of the metal materials of these outer bodies caused by the impact cracking of the coating film.

In automobiles running on such roads, the coating film on their outer portions is hit by the rock particles and pebbles flipped by the wheels and this impact often causes an impact cracking phenomenon, namely, so-called "chipping" in which the coating film locally peels off the body completely. Owing to this phenomenon, the metal surface of the outer body beneath the hit areas of the coating film is exposed to an atmosphere leading to rapid formation of rust and progress of corrosion. The cracking of coating film due to chipping ordinarily appears more in the bottom and underbody but it appears even in the hood of the roof. For example, in the cold climatic areas of Europe and America, in order to prevent the surface freezing of roads for automobiles, there are often laid on the roads in winter pebbles mixed with a large quantity of rock salt ground to relatively coarse particles.

In order to prevent the chipping of coating film and the resulting progress of corrosion of the metal substrate beneath the coating film, there have heretofore been made various investigations on the chemical treatment, electrodeposition coating primer, intermediate coating paint, and top-coating paint to be applied to the surface of metallic substrate of automotive outer body. For example, with respect to the chemical treatment, there was investigated for formation of an iron phosphate type film and a zinc phosphate type film each of different crystal form, but such a chemical treatment cannot elevate the adhesivity of coating film to substrate metal to a level sufficiently resisting the impact of pebbles, etc. Also, with respect to the electrodeposition coating paint and the top coating paint, various investigations were made on resins and/or pigments to be contained in these paints, but no electrodeposition coating paint or top coating paint having an adhesivity sufficiently resisting the chipping has been developed yet.

Meanwhile, there is an attempt to improve chipping resistance, etc., by coating a resilient coating film-forming aqueous paint composed mainly of an olefinic resin between the electrodeposition coating paint and the intermediate coating paint. However, this is not yet sufficiently practical. and when the aqueous paint is used after long-term storage, chipping resistance notably decreases. Besides, distinctness of image gloss and impact resistance after top coating is insufficient.

Automotive outer bodies such as bumpers, facias, fenders, door panels, panel hoods, panel roofs, panel trunk lids, etc., which have been heretofore composed mostly of metallic members, are recently increasingly replaced by plastic members, either partly or completely. For example, as bumpers and facias those made of plastics such as polyurethane, polypropylene, polycarbonate or the like, are used. There are also fenders and door panels of which lower portions only are made of plastics as above. It is inevitable that the plastics will be used in still increased scales for automotive outer bodies, that tendency being already clear with panel roofs and panel trunk lids. This is because of such advantages derived from the use of plastics, as reduction in fuel cost due to reduced automotive body weight, easier workability allowing molding into optional forms, improvement in corrosion resistance and impact resistance of the automotive bodies.

Under such recent trend, however, a process for coating the automotive outer bodies composed of metallic and plastic members has not yet been at all established, and heretofore the metallic members and plastic members entirely differing in physical and chemical properties were coated through separate coating lines with different types of paints respectively suitable for the metals and plastics, and thereafter assembled into the outer bodies. With such a method, however, it is extremely difficult to coordinate the color tones of the two types of members to be integrated into the automotive body because the paints use for the members (particularly the colored base coating paints) are different. There are also still other defects that the coating steps and the subsequent assembling step of those members are rendered complex.

Hence, the present inventors made an extensive study in order to improve the above mentioned conventional drawbacks and to provide a process for coating a metallic substrate, particularly a steel panel to form thereon a multi-layered coating film excellent in storage stability, chipping resistance, corrosion resistance, smoothness, distinctness of image gloss, weather resistance and other physical properties and yet having a good film appearance as possessed by conventional coating systems for steel panels comprising a cationic electrodeposition coating paint, an intermediate coating paint which is optional, and a top coating paint. As a result, the present invention has been completed.

Under the circumstances, the present inventors have made concentrative studies in search for a process which will enable finishing of automotive bodies assembled from metallic members and plastic members to an identical paint by a simplified procedure, finishing of appearance of a coating film which is at least equal to, or higher than, the conventional appearance, and formation of a coating film exhibiting excellent chipping resistance. As a result, they have found that the above defects can be overcome if the metallic members and the plastic members, after being assembled into an integral body, are first applied with a barrier coat having a specific composition and then applied with the top coating paint, or the intermediate coating paint and the top coating paint.

Thus, this invention is to provide a process for coating a surface of a substrate containing a metallic member (this substrate may further contain a plastic member), which comprises first coating a cationic electrodeposition coating paint on the metallic member, then integrating the coated metallic member with the plastic member if required, coating an aqueous barrier coat composed mainly of a composition comprising an olefin resin and a urethane resin, further coating an intermediate coating paint if required, and thereafter coating a top coating paint.

An important characteristic of the present invention lies in that in a process for coating a metallic substrate, particularly a steel panel with a cationic electrodeposition coating paint, an optional intermediate coating paint and a top coating paint in this order, a barrier coat having a particular composition is applied on the electrodeposition coating film formed, prior to the application of the optional intermediate coating paint or the top coating paint. Thanks to the application of this barrier coat, the formation of a composite coating film very excellent in chipping resistance, smoothness, distinctness of image, gloss corrosion resistance, weather resistance and other physical properties has become possible.

According to a preferred embodiment of the invention, therefore, there is provided a process for coating automotive outer bodies composed of metallic members and plastic members, which comprises assembling the metallic and plastic members into an automotive outer body, applying a cationic electrodeposition coating paint to the metallic members either before or after the assembling, applying to the surfaces of the two types of members composing the assembled body, including the electrodeposition coated surfaces, a barrier coat having the particular composition, optionally applying an intermediate coating paint onto the barrier coating, and thereafter applying thereto the top coating paint.

One of the conspicuous characteristics of the present invention resides, in the process comprising application of a top coating paint optionally after an intermediate coating paint, onto an automotive outer body composed of an assemblage of the cationically electrodeposition coated metallic members and plastic members, in the advance application of a barrier coat having a specific composition onto the outer body, preceding the application of said paint or paints. Consequently it was made possible to apply the same intermediate and top coating paints to both the metallic and plastic members, to eliminate the disagreement in color tones between the two types of members. Furthermore, the thus formed coating film are markedly improved in chipping resistance, corrosion resistance and physical properties, as well as finish appearances such as distinctness of image gloss, smoothness and storage stability. Hence, even if the surface of the top coating film formed on or above the barrier coat film having the abovementioned physical properties receives a strong impact of rock salt, pebbles, etc., the impact energy is mostly or completely absorbed within the barrier coat film and does not reach the electrodeposition coating film beneath the barrier coat film and moreover even the top coating film and the optional intermediate coating film undergo little physical damage. That is, the barrier coat film has a buffer action for external impacts, whereby the chipping resistance of the coating film system has been remarkably improved, development of rust and corrosion on steel panels caused by chipping has been prevented and the deterioration of the top coating film due to collision of rock salt, pebbles, etc. has been solved.

Namely, the barrier coat film is flexible as compared with conventional intermediate and top coating films and has a viscoelasticity inherently possessed by the modified polyolefin resins. Therefore, by applying in advance the coating film having such physical properties onto the entire surfaces of both metallic and plastic members of an automotive outer body, all or nearly all of the "strain" between the intermediate coating film and top coating film due to the physical differences between the two types of members such as thermal elasticity and pliability, etc. can be absorbed by the barrier coat. Thus the effects of "strain" on the intermediate and top coating films can be almost completely prevented. Consequently, it is made possible to apply the intermediate and top coating paints of identical compositions, respectively, to the entire surfaces of the two types of members composing the automotive outer body, to finish them to an identical color tone.

Furthermore, when the surfaces of the coating film composed of the top coating optionally with an intermediate coating formed on the outer body through the barrier coat are subject to intense impact forces exerted by rock salt or pebbles, all or nearly all of the impact energy is absorbed by the barrier coat, so that peeling of the coating film scarcely takes place. Furthermore, occurrence of physical damages in the top coating film also can be nearly completely eliminated, realizing prevention of peeling-off of the top coating and in certain cases also the intermediate coating by chipping, as well as of rusting and corrosion of metal members.

It has been found that as the aqueous barrier coat, an aqueous dispersion of a polyolefin resin alone generally lacks storage stability because of a large dispersion particle size, but when it is blended with an emulsion of a polyurethane resin, storage stability greatly improves, and that even after the long-term storage, decrease in chipping resistance of a coating film is not observed and distinctness of image gloss is excellent.

By the way, in the process of this invention, the intermediate coating can be omitted as required, and after coating the barrier coat, the top coating paint may directly be coated on the coated surface.

The coating process of this invention will be described in more detail below.

Substrate material containing a metallic member:

In the coating process of this invention, a substrate material being coated includes not only a material composed substantially of a metallic member alone but also an assembly of the metallic member and a plastic member.

As the metallic member to which the process of this invention is applicable, there can be used any materials having a metal surface to which cationic electrodeposition coating can be applied. Such materials include, for example, shaped articles made of iron, copper, aluminum, tin, zinc or an alloy thereof as well as products having a plated or deposited film of said metal or alloy. A steel panel is particularly preferred. Specifically, there are mentioned bodies and parts made of said materials, of passenger cars, trucks, safari cars, motor bicycles, etc. It is preferable that the surfaces of these metallic substrates be subjected to a chemical treatment with a phosphate, a chromate or the lie prior to the application thereon of a electrodeposition coating paint.

As the assembly of the metallic member and the plastic member, an automotive outer body can be taken, for example.

In the present process, the term "automotive outer body" intended for the coating means the outer body formed by assembling and integrating the metallic members and plastic members, e.g., such parts as a bumper, facia, fender, door panel, panel hood, panel roof, panel trunk lid, or the like, and those composed of more than one of above parts, by combining and integrating them. That is, the term is meant to include each individual part itself composed of plastic members and metallic members; and those in which part(s) composed of metal members and part(s) composed of plastic members are integrated. The metallic members are mainly made of iron, copper, aluminium, zinc or alloys containing them, and the plastic members are composed of such synthetic resins as, for examples, polyamides, polyurethanes, polypropylenes and polycarbonates.

It should be understood, furthermore, that the term, "automotive" used in the "automotive outer body" is not limited to those for riding, but is used in the broader sense inclusive of motorcycles, trucks, safari cars, and the like.

It is advisable that the metallic member is, as required, chemically treated in advance with zinc phosphate, iron phosphate or chromate in a usual manner, and then coated with a cationic electrodeposition coating paint.

Meanwhile, it is advisable that the plastic member is surface-treated by degreasing with solvent vapor, hot water treatment, rubbing, acid treatment, corona discharge treatment, etc.

Cationic electrodeposition coating paint:

This is an electrodeposition coating paint being coated on the metallic member of the substrate, and can be a paint known per se. As the cationic electrodeposition coating paint, an aqueous paint can be taken, for example, which is prepared by using, as a vehicle, a basic group-containing resin being rendered water-dispersible by neutralization with an organic or inorganic acid, such as an epoxy, acrylic or a polybutadiene resin having an amino group in a resin skeleton; blending the resin with a neutralizing agent, a pigment (a color pigment, an extender pigment, a rust-proofing pigment, etc.), and a hydrophilic solvent, as well as, if required, a curing agent, and a crosslinking agent; and forming the blend into a paint in a usual manner.

Examples of the neutralizing agent for neutralizing and water-solubilizing (dispersing) the basic group-containing water-dispersible resin (which is commonly used by dissolving it with a hydrophilic solvent) include organic acids such as acetic acid, hydroxyacetic acid, propionic acid, butyric acid, lactic acid, and glycine; and inorganic acids such as sulfuric acid, hydrochloric acid and phosphoric acid. The suitable amount of the neutralizing agent is about 0.1 to 0.4 time the neutralization equivalent relative to the base value (usually about 50 to 200) of the resin.

The above aqueous paint can usually be electrodeposition-coated on the metallic member in a usual manner by diluting said paint with deionized water such that the solids content reaches about 5 to 40% by weight and keeping pH in the range of 5.5 to 8.0. The thickness of the electrodeposition coated film is not particularly limited. However, it is usually 10 to 40 microns based on the cured coating film, and the coating film can be cured by heating it at about 120° to 210° C.

A blocked polyisocyanate compound is available as a curing agent for curing the coating film.

An epoxy resin having at least 2 epoxy functional groups each comprising an epoxy group directly bound to an alicyclic ring and/or a bridged alicyclic ring on average per molecule is also available as a curing agent. Said epoxy functional group in the epoxy resin comprises an epoxy group directly bound to an alicyclic ring and/or a bridged alicyclic ring in which said alicyclic ring is a 4–10 membered, preferably 5–6 membered saturated carbon monocyclic or polycyclic ring.

Furthermore, an epoxy group $$( \rangle C \underset{O}{-\!-\!-} C \langle )$$

is important in that one of the carbon atoms in said epoxy group is directly bonded to the cyclic carbon atom (or atoms), of said alicyclic ring or said bridged alicyclic ring (see, for example, the following formulae (I) and (II)), or the two carbon atoms of said epoxy group are common with the two adjoining carbon atoms constituting the ring in said alicyclic ring or said bridged alicyclic ring (see, for example, the following formulae (III) and (IV)).

The specific examples of such epoxy functional group are those represented by the following formulae (I) to (IV).

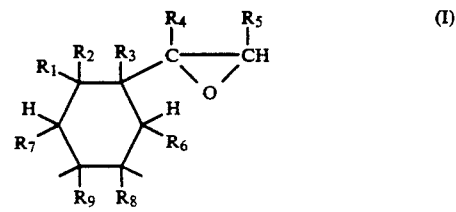

(I)

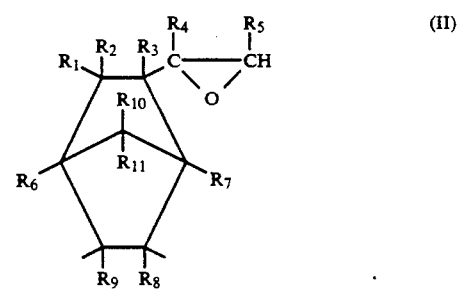

(II)

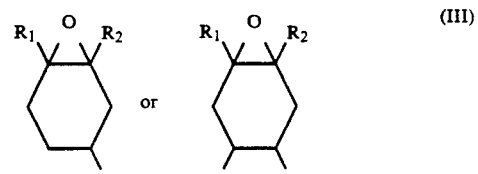

(III)

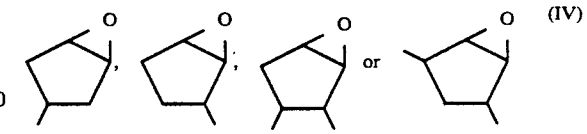

(IV)

wherein
$R_1$, $R_2$, $R_3$, $R_5$, $R_6$, $R_7$, $R_{10}$ and $R_{11}$ represent H, CH$_3$ or C$_2$H$_5$, respectively, while $R_4$, $R_8$ and $R_9$ represent H or CH$_3$, respectively.

The aforesaid epoxy resin curing agent is minutely described in British Patent No. 356,970.

The epoxy resin used in this invention preferably may have at least 2, preferably at least 3, more preferably at least 4, epoxy functional groups selected from said formulae (I) to (IV) on average in one molecule.

The cationic electrodeposition coating on the metallic member may be conducted either before or after integrating the metallic member with the plastic member. In the latter case, the cationic electrodeposition coating is, in principle, not applied to the plastic member.

Barrier coat

The barrier coat used in this invention is an aqueous paint containing, as a vehicle main component, an olefin resin and a urethane resin.

The olefin resin for use in the present barrier coat is a homo- or co-polymer consisting essentially of an olefin monomer and/or a diene monomer. Examples of useful olefin resins are a propylene-ethylene copolymer, chlorinated polypropylene, EPDM (ethylene-propylenediene terpolymer), polybutadiene, a styrene-butadiene copolymer, an acrylonitrile-butadiene copolymer, etc.; and modified acid group-containing polyolefins obtained by modifying these polymers or copolymers with a carboxyl-containing polymerizable unsaturated monomer such as maleic acid, maleic anhydride, acrylic acid, methacrylic acid or the like.

Among the above olefin resins, it is desirable to use the acid group-containing polyolefin which is prepared by the addition of maleic acid or maleic anhydride to chlorinated polypropylene, because the chlorinated polypropylene component exhibits excellent adhesion to propylene substrates as the plastic member and because the maleic acid or anhydride component exhibits excellent adhesion to overcoats and has high resistance to water. These features of the components result in the advantage that the adhesion of the modified polyolefin is less susceptible to deterioration. Preferably, the chlorinated polypropylene is 20 to 30 wt. % in chlorination ratio. Maleic acid or anhydride as the carboxyl-containing unsaturated monomer can be used in an amount of usually about 0.5 to about 10 wt. %, preferably about 1 to about 5 wt. %, based on the modified olefin resin to be obtained.

The olefin resin used is about 3,000 to about 50,000, preferably about 10,000 to about 30,000, in number average molecular weight. When smaller than about 3,000 in molecular weight, the resin is not desirable since the coating obtained is liable to become tacky, permitting adhesion of dust or like extraneous matter, giving a poor appearance to the top coat finally formed or exhibiting impaired adhesion to plastics substrates after having been subjected to a water resistance test. On the other hand, when greater than about 50,000 in molecular weight, the resin has the drawback of failing to form smooth coatings and is undesirable.

The urethane resin to be used in combination with the olefin resin is a urethane polymer obtained by reacting an active hydrogen-containing compound (1) having at least two active hydrogen atoms in the molecule on the average with a polyisocyanate compound (2), or a urethane polymer obtained by reacting the active hydrogen-containing compound (1) with the polyisocyanate compound (2) in the presence of an excessive amount of isocyanate groups to obtain an isocyanate-containing prepolymer, and then reacting the prepolymer with a chain extending agent. The urethane resin may have a carboxyl group incorporated therein.

Any compound is usable as the active hydrogen-containing compound (1) insofar as it has at least two active hydrogen atoms (preferably hydroxyl groups) in the molecule on the average. Examples of such compounds are as follows:

(i) Diol compounds such as ethylene glycol, propylene glycol, diethylene glycol, triethylene glycol, 1,2-butylene glycol, 1,3-butylene glycol, 2,3-butylene glycol, 1,4-butylene glycol, 1,5-pentanediol, neopentyl glycol, 1,6-hexane diol, 2,5-hexanediol, dipropylene glycol, 2,2,4-trimethyl-1,3-pentanediol, tricyclodecane dimethanol, 1,4-cyclohexane dimethanol, and the like.

(ii) Polyether diols such as alkylene oxide adducts of the above diol compounds (i), those obtained by subjecting alkylene oxides, cyclic ethers (e.g., tetrahydrofuran), or the like to ring opening polymerization or ring opening copolymerization (block or random copolymerization), examples being polyethylene glycol, polypropylene glycol, an ethylene glycol-propylene glycol copolymer (block or random), polytetramethylene glycol, polyhexamethylene glycol, polyoctamethylene glycol, and the like.

(iii) Polyester diols including those prepared from a dicarboxylic acid (or anhydride) [such as adipic acid, succinic acid, sebacic acid, glutaric acid, maleic acid, fumaric acid or phthalic acid] and a glycol [such as ethylene glycol, propylene glycol, 1,4-butanediol, 1,6-hexanediol, 1,8-octamethylenediol, neopentyl glycol, bis(hydroxymethyl) cyclohexane, bis(hydroxyethyl)-benzene, alkyldialkanolamine, m-xylylene glycol, 1,4-bis(2-hydroxyethoxy)benzene or 4,4'-bis(2-hydroxyethoxy)-diphenylpropane], by subjecting the acid or anhydride and the glycol to condensation polymerization in the presence of an excess of hydroxyl, examples being an ethylene glycol-adipic acid condensation polymer, a butanediol-adipic acid condensation polymer, a hexamethylene glycol-adipic acid condensation polymer, an ethylene glycol-propylene glycol-adipic acid condensation polymer and condensation polymer of bis(hydroxymethyl)cyclohexane and a mixture of $C_4$-$C_8$ straight-chain dicarboxylic acids (e.g., K-FLEX-148 and -188, products of King Industries Inc. Co.). Also useful are polylactonediols obtained by subjecting a lactone to ring opening polymerization using a glycol as an initiator (such as polycaprolaconediol prepared using ethylene glycol as an initiator).

(iv) Polyether ester diols prepared by reacting and ether-containing diol (such as the above-mentioned polyether diol, diethylene glycol, triethylene glycol or dipropylene glycol) or a mixture of the diol and other glycol with the above-mentioned dicarboxylic acid (or anhydride) for condensation polymerization, or reacting the diol or the mixture with the acid (or anhydride) and an alkylene oxide, examples being a polytetramethylene glycol-adipic acid condensation polymer, etc.

(v) Polycarbonate diols such as compounds represented by the formula

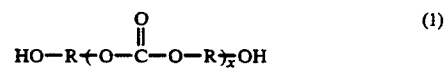 (1)

wherein R is the residue of a $C_1$ to $C_{12}$ saturated aliphatic diol, and x is the number of repeating units in the molecule and is usually an integer to 5 to 50. These compounds are prepared, for example, by the ester exchange method wherein a saturated aliphatic diol having aliphatic hydrocarbon group of 1 to 12 carbon atoms (such as 1,4-butanediol, 1,5-pentanediol, 1,6-hexanediol, diethylene glycol, tetraethylene glycol, dipropylene glycol, a co-condensation polymer of ethylene glycol and propylene glycol, etc.) is reacted with a substituted carbonate (such as diethyl carbonate, diphenyl carbonate, etc.) in the presence of an excess of hydroxyl, or by a process wherein the above saturated aliphatic diol is reacted with phosgene and which, when required, may be followed by the reaction of the product with a saturated aliphatic diol.

The diols (i) to (v) given above can be used singly, or at least two of them are usable in combination. Among the diols (i) to (v), preferable are diols (i) to (iii). More preferable are those having a number average molecular weight of up to about 5000, especially about 1000 to about 3000.

The urethane resin for use in the present composition may be prepared using, in addition to the above diol, a small amount of a low-molecular-weight polyol (vi) containing at least three hydroxyl groups in the molecule (preferably up to 500 in number average molecular weight) as a component having at least two active hydrogen atoms in the molecule on the average.

The use of the low-molecular-weight polyol (vi) entails, for example, the following advantage. Since the polyol forms branches on the molecular skeleton of the urethane resin, a three-dimensional structure can be given to the urethane resin, permitting polyurethane particles to form an aqueous dispersion of improved stability and giving the coating formed higher resistance to water and chemicals.

Examples of useful low-molecular-weight polyols (vi) are trimethylolpropane, trimethylolethane, glycerin, tris-2-hydroxyethyl isocyanurate, pentaerythritol, etc. The polyol (vi) can be used in an amount of up to about 0.1 mole per mole of the diol. Use of more than about 0.1 mole of the polyol is not desirable since the coating formed will have impaired physical properties.

The polyisocyanate compound (2) to be reacted with the active hydrogen-containing compound (1) is an aliphatic, alicyclic or aromatic compound containing at least two isocyanate groups in the molecule on the average. Examples of aliphatic diisocyanate compounds are those having 1 to 12 carbon atoms such as hexamethylene diisocyanate, 2,2,4-trimethylhexane diisocyanate, lysine diisocyanate, etc. Examples of alicyclic diisocyanate compounds are those having 4 to 18 carbon atoms such as 1,4-cyclohexane diisocyanate, 1-isocyanate-3-isocyanatomethyl-3,5,5,-trimethylcyclohexane (isophorone diisocyanate), 4,4'-dicyclohexylmethane diisocyanate, methylcyclohexylene diisocyanate, isopropylidenedicyclohexyl-4,4'-diisocyanate, etc. Examples of aromatic diisocyanate are tolylene diisocyanate, 4,4'-diphenylmethane diisocyanate, xylylene diisocyanate and m-xylylene diisocyanate. Examples of polyisocyanate compounds having at least three isocyanate groups are triphenylmethane-4,4'4''-triisocyanate 1,3,5-triisocyanatobenzene, 2,4,6-triisocyanatotoluene, 4,4'-dimethyldiphenylmethane-2,2'5,5'-tetraisocyanate, and the like. Also useful are biuret type adducts, isocyanuric ring type adducts and modified products (carbodiimide-, urethodion- and urethoimine-containing modified products) of the above diisocyanate. These polyisocyanates can be used singly, or at least two of them are usable in admixture. Of these, preferable polyisocyanate compounds are alicyclic and aromatic diisoycantes; isophorone diisocyanate, tolyene diisocyanate, 4,4'-diphenylmethane diisocyanate and xylylene diisocyanate are more preferable.

Any of conventional methods is usable for introducing carboxyl into the urethane resin. For example, it is suitable to introduce carboxyl into the polyether diol (ii), polyester diol (iii) or polyether ester diol (iv) by replacing the glycyl compound partly or entirely by a dimethylolalkanoic acid, or to introduce carboxyl into the urethane resin by using the diol (i) or (v) as admixed with a dimethylolalkanoic acid. Examples of useful dimethylolalkanoic acids are dimethylolacetic acid, dimethylolpropionic acid, dimethylolbutyric acid and dimethylolvaleric acid, etc.

The urethane resin having carboxyl introduced thereinto can be dispersed in water without using any surfactant or with use of a reduced amount of surfactant and therefore has the advantage of giving improved water resistance to the coating obtained. The amount of carboxyl to be incorporated into the urethane resin is about 25 to about 150, preferably about 30 to about 100, more preferably about 50 to about 80, in terms of the acid value of the resin. If the acid value is smaller than about 25, there arises a need to use a surfactant to render the resin miscible in water with good stability, whereas acid values grater than about 150 are likely to give lower water resistance to the coating.

The urethane resin to be used is usually about 10,000 to about 100,000, preferably about 20,000 to about 50,000 more preferably 25,000 to 35,000 in number average molecular weight. In case the urethane resin is prepared by reacting the active hydrogen-containing compound (1) with the polyisocyanate compound (2) to obtained an isocyanate-containing prepolymer, and then extending the chain thereof, the prepolymer is about 1,000 to about 3,000 in number average molecular weight, and the molecular weight of the urethane resin is adjusted to the above range. The isocyanate-containing prepolymer is obtained by reacting the compounds (1) and (2) usually in such a ratio that the NCO/OH equivalent ratio is 1.1 to 1.9. When lower than about 10,000 in number average molecular weight, the urethane resin is liable to exhibit lower water resistance and impaired flexibility, whereas if the molecular weight is greater than about 100,000, the resin will settle or coagulate during the storage of the coating composition, producing defects such as seeding in the coating or imparing the smoothness of the coating.

The chain of the isocyanate-containing prepolymer can be extended by a known method, for example, by reacting the prepolymer with a chain-lengthening agent such as water, water-soluble polyamine, glycol, or the like. When required, a catalyst is usable for this reaction. The water-soluble polyamine to be used is one having a primary amino group and/or secondary amino group at least two in number per molecule. Example of suitable polyamine compounds are ethylenediamine, tetramethylenediamine, hexamethylenediamine, xylylenediamine, diethylenetriamine, triethylenetetramine and like water soluble polyamine, piperazine, and like water-soluble alicyclic polyamine, and mixtures of such polyamines. Examples of suitable glycols are ethylene glycol, propylene glycol, diethylene glycol, triethylene glycol, butanediol, hexanediol, trimethylolpropane, and the like.

Examples of useful reaction catalysts are trimethylamine, triethylamine, triisopropylamine, tri-n-propylamine, tri-n-butylamine and like trialkylamines; N-methylmorpholine, N-ethylmorpholine and like N-alkylmorpholine; N-dialkylalkanolamines such as N-dimethylethanolamine and N-diethylethanolamine; N-alkylvinylpyrrolidones; and mixtures of at least two of these compounds.

The aqueous barrier coat may be formed from the olefin resin and the urethane resin by any method known per se. Examples of the method are as follows.

1) a method in which a urethane resin (substantially free from an isocyanate group) and an olefin resin are mixed, a surfactant and/or a neutralizing agent is then added, and the mixture is dispersed in water.

2) a method in which the active hydrogen-containing compound (1) and the polyisocyanate compound (2) as starting materials to form the urethane resin are mixed with an olefin resin, these compounds (1) and (2) are then reacted (so that the mixture is substantially free from an isocyanate group), and then a surfactant and/or a neutralizing agent is added, followed by dispersing the mixture in water.

3) a method in which a substance obtained by adding a surfactant and/or a neutralizing agent to an olefin resin and dispersing the mixture in water is mixed with a substance obtained by adding a surfactant and/or a neutralizing agent to a urethane resin and dispersing the mixture in water.

4) a method in which the above NCO-containing urethane prepolymer (usually an NCO/OH equivalent ratio of 1.1 to 1.9) is mixed with an olefin resin, the mixture is dispersed in water and at the same time a chain-extending reaction is carried out. In this method, the other chain extender may be added together with water, and a catalyst for chain extending reaction, a surfactant and a neutralizing agent be also added as required.

5) a method in which the active hydrogen-containing compound (1) and the polyisocyanate compound (2) as starting materials to form the urethane resin are mixed and reacted to form a mixture of an NCO-containing urethane prepolymer (NCO/OH equivalent ratio about 1.1 to 1.9) and the olefin resin, and dispersion in water and a chain extending reaction are performed at the same time as in 4).

6) a method in which a substance obtained by subjecting the NCO-containing urethane prepolymer to the chain extending reaction and the dispersion in water at the same time is mixed with the aqueous dispersion of the olefin resin described in 3).

The neutralizing agent can be used when an acid group is present in the urethane resin, the olefin resin and the urethane prepolymer. In this case, the aforesaid examples of the catalyst for the chain extending reaction is available as this neutralizing agent. Of these, trialkylamines and N-alkylvinylpyrrolidones are preferable, and triethylamine is most preferable. The amount of neutralization is about 0.5 to 2.0 equivalents, preferably about 1 to 1.5 equivalents per equivalent of the carboxyl group.

Examples of the surfactant include nonionic surfactants, e.g., ethylene oxide adducts such as higher alcohols, alkylphenols, arylphenols, and polyoxypropylene glycol; anionic surfactants such as sulfates and alkylbenzenesulfonates of ethylene oxide adducts such as alkylphenols and higher alcohols; and mixtures thereof. The amount of the surfactant is about 10 parts by weight or less, preferably 5 parts by weight or less per 100 parts by weight of a resin solids content from the aspect of water resistance of a coating film.

When using, among the abovementioned, the substance obtained by the chain extending reaction, it helps disperse the polyolefin resin in water and can stabilize the resin particles, making it possible to obtain a coating film having excellent properties in water resistance and appearance. As the polyurethane polymer obtained by the chain extending reaction, one containing an acid group is desirous.

Regarding the olefin resin and the urethane resin as the vehicle components of the barrier coat, the amount of the olefin resin is about 5 to 40% by weight, preferably about 10 to 30% by weight, based on the total solids content of both the resins; the amount of the urethane resin is about 95 to 60% by weight, preferably about 90 to 70% by weight, based on the total solids content of both the resins. When the amount of the polyolefin resin is less than 5% by weight or the amount of the urethane resin is more than about 95% by weight, adhesion decreases. While, when the amount of the olefin resin is more than about 40% by weight or the amount of the urethane resin is less than about 60% by weight, adhesion to the top coating film, water resistance and storage stability of the paint undesirously decrease.

In the composition obtained by water-solubilizing via the methods 1) to 6), the urethane resin component is used as a component to help the olefin resin disperse in water and as a component to stabilize the olefin resin particles; such an aqueous product of the urethane resin and the olefin resin can further be mixed with an aqueous dispersion of a urethane resin as a component having a function to improve performance of a coating film. As the aqueous dispersion of the urethane resin used to improve performance of the coating film, the aqueous dispersion of the urethane resin described in the water-solubilizing method is also available.

A desirable combination of the urethane resin (hereinafter referred to as a "urethane resin A") contained in the aqueous product of the urethane resin and the olefin resin obtained in the above 1) to 6) and the urethane resin (hereinafter referred to as a "urethane resin B") in the aqueous dispersion of the urethane resin being added to the aqueous product to improve performance of the coating film is a combination of, as the urethane resin A, a urethane resin using the monomers having good compatibility with the olefin resin, e.g., the aliphatic or alicyclic polyol as the active hydrogen-containing compound (1) and the aliphatic or alicyclic diisocyanate compound as the polyisocyanate compound (2), and as the urethane resin B, a urethane resin using the monomer having excellent properties, e.g., the aromatic diisocyanate as the polyisocyanate compound (2). It is suitable that based on the total resin solids content, the amount of the olefin resin is about 5 to 40% by weight, preferably about 10 to 30% by weight, the amount of the urethane resin A is about 15 to 60% by weight, preferably about 20 to 50% by weight, and the amount of the urethane resin B is about 0 to 80% by weight, preferably about 20 to 70% by weight.

It is advisable that the resin component dispersed in the aqueous product used as the barrier coat has an average particle size of about 0.001 to 5 micrometers, preferably about 0.05 to 2.0 micrometers from the aspects of storage stability, compatibility, and smoothness of a coated surface.

Further, the barrier coat can contain a color pigment, an extender pigment, a coated surface regulator, a popping preventing agent, a fluidity adjustor, a cissing preventing agent, and a plasticizer.

The barrier coat is ordinarily used by adjusting it to a solids content of about 20 to 50% by weight and a viscosity of 500 to 3,000 cps (measured by a B-type viscometer at 6 rpm).

In this invention, the barrier coat is coated on the surface of the cationic electrodeposition coated metallic portion and optionally the plastic portion. The coating method is not particularly limited. Spray coating, brush coating, dip coating, melt coating and electrostatic coating are available. The thickness of the coating paint is usually 5 to 50 microns, especially 10 to 20 microns, based on the coating film. The coating film can be dried at a temperature of usually room temperature to 160° C., preferably about 80° to 120° C.

It is advisable that to improve the electrostatic coating onto the plastic member, the barrier coat is blended with an electroconductive material to adjust a volume resistibity of the coating film to $10^7$ Ωcm or less, especially $10^3$ to $10^5$ Ωcm. Examples of the electroconductive material are a powder of electroconductive carbon, graphite, silver, copper, nickel, aluminum, zinc oxide, tin dioxide or tungsten oxide; a composite metallic powder composed of tin oxide and antimony oxide; and a material obtained by coating the above electroconductive material on a surface of a product having a characteristic form, such as mica, titanium oxide or potassium titanate.

It is desirable that the amount of the electroconductive material is within such a range as not to impair physical properties of the barrier coat film. It is advisable that said amount is 100 parts by weight or less per 100 parts by weight of the resin solids content of the barrier coat.

Intermediate coating paint

Onto the surface of the barrier coat film can be applied an intermediate coating paint, prior to the application of a top coating paint. The main purpose of conducting this intermediate coating is to allow a final coating film to have a high quality excellent in durability, surface smoothness and sharpness, adhesion, etc. Therefore, when the final coating film is not required to have such a high quality, the intermediate coating can be omitted. However, in the preferred embodiments of the process of this invention, the application of an intermediate coating paint is generally preferable.

As the intermediate coating paint optionally usable in the process of this invention, there can be used any known intermediate coating paint which has been used in conventional coating systems consisting of a primer, an intermediate coating paint and a top coating paint and is excellent in adhesion, distinctness of image gloss (surface smoothness), surface sharpness, overbaking resistance, weather resistance, etc. Specifically, there can be mentioned thermosetting intermediate coating paints using, as a vehicle main component, a combination of (1) a short or ultra-short oil alkyd resin having an oil length of 30% or less and/or an oil-free polyester resin and (2) an amino resin. The alkyd resin and the polyester resin desirably have a hydroxyl value of usually 60 to 140, particularly 80 to 120 and an acid value of 5 to 100.

As the oil usable for modification of the alkyd resin, there can be mentioned, for example, drying oils or semi-drying oils such as linseed oil, soybean oil, safflower oil, tung oil, tall oil, dehydrated castor oil, and the like, as well as unsaturated fatty acids obtained from said oils.

As the amino resin used in combination with the oil-modified alkyd resin or the oil-free polyester resin, generally there are suitably used melamine resins etherified with an alkyl group of 1 to 5 carbon atoms, urea resins, benzoguanamine resins, etc. With respect to the ratio of the amino resin to other resins, it is desirable that the oil-modified alkyd resin and/or the oil-free polyester resin is 65 to 85%, preferably 70 to 80% in terms of solid weight and the amino resin is 35 to 15%, preferably 30 to 20%. At least part of the amino resin can be replaced by a polyisocyanate compound or a blocked polyisocyanate. As the blocked or non-blocked polyisocyanate compound, there can be mentioned, for example, tolylene diisocyanate, diphenyl methane diisocyanate, xylylene diisocyanate, hexamethylene diisocyanate, isophorone diisocyanate, a reaction product between 1 mole of trimethylolpropane and 3 moles of tolylene diisocyanate or hexamethylene diisocyanate.

The intermediate coating paint using the above resins as vehicle components preferably has a form of organic solvent type or aqueous type (aqueous solution or aqueous dispersion). The organic solvent type is most preferably. The intermediate coating paint may also have a form of non-aqueous dispersion type, high solid type, powder type, or the like. It is preferably that the intermediate coating paint give a coating film having a pencil hardness of usually 3B to 2H, preferably B to 2H at 20° C. The intermediate coating paint can further contain, if necessary, extender pigments, color pigments and other additives ordinarily used for coatings, in amounts ordinarily used.

The application of the intermediate coating paint on the barrier coat film can be conducted, as in the application of the barrier coat, using a method such as spray coating, brush coating, dip coating, melt coating, electrostatic coating, or the like. It is preferable that the intermediate coating film have a thickness of usually 10 to 100μ, preferably 10 to 50μ. The curing of the intermediate coating film can be conducted at any temperature suitable for the curing characteristic of the film as long as the temperature causes no substantial thermal deterioration of the film. However, when thermal curing is applied, the curing temperature is preferably room temperature to 170° C., more preferably 80° to 150° C.

Top coating paint

This is a paint to be applied on the surface of the barrier coat film or of the intermediate coating film in order to give the coated bodies pleasant appearance. As this top coating paint, there can be used top coating paints used in conventional coating systems consisting of a primer, an intermediate coating paint and a top coating paint. As such top coating paint, there can generally be used known paints capable of forming a coating film excellent in surface appearance (e.g. distinctness of image gloss, smoothness, gloss), weather resistance (e.g. gloss retention, color retention, chalking resistance), chemical resistance, moisture resistance, water-resistance, curability, etc. As the top coating paint usable in the process of this invention, there can be mentioned, for example, paints preferably of organic solvent type, non-aqueous dispersion type, aqueous solution or dispersion type, powder type or high solid type using as the main vehicle component a resin such as an amino-acryl resin type, an acid-glycidyl-acryl resin type, an isocyanate-acryl resin type, an amino-alkyd resin system, an amino-polyester resin type, an isocyanate-polyester resin type, or the like.

Preferable examples of the top coating paint include an amino acryl resin type paint, namely, a thermosetting paint using an amino resin as a cross-linking agent. This paint uses, as main components, (a) an acryl resin obtained by polymerizing an appropriate combination of a hard monomer (e.g., methyl methacrylate, ethyl methacrylate, n-butyl methacrylate, and isobutyl methacrylate), a soft monomer (e.g., n-hexyl methacrylate, lauryl methacrylate, methyl acrylate, ethyl acrylate, n-butyl acrylate, and 2-ethylhexyl acrylate), a functional group-containing monomer (e.g., acrylic acid, methacrylic acid, hydroxyethyl methacrylate, hydroxyethyl acrylate, acrylamide, and glycidyl acrylate) and other monomers (e.g., styrene, and acrylonitrile) and (b) an amino resin selected from resins such as a melamine resin etherified with an alkyl group of 1 to 5 carbon atoms and urea resin etherified with an alkyl group of 1 to 5 carbon atoms. Said acryl resin (a) preferably has a number average molecular weight of 5,000 to 50,000, a hydroxyl value of 5 to 40 and an acid value of 2 to 100. Another preferable example of the top coating paint is an amino alkyd resin type paint, wherein a butylated melamine resin is preferable as the amino resin component and an alkyd resin modified with a semi-drying oil or an ultrashort oil alkyd resin is preferable as the alkyd resin component.

The top coating paint here referred to is a coating film having a hardness (as cured) of 2B to 3H at 20° C. when measured in accordance with a pencil hardness testing method.

The pencil hardness testing method used in this invention is such that a glass plate is coated with a paint to be tested according to the process of this invention, the resulting composite coating film is cured, the resulting test plate is kept at 20° C., a pencil ("Uni" for drawing use, manufactured by Mitsubishi Pencil Ltd.) whose lead tip has been ground flatly so as to have a sharp edge is strongly pressed onto the coated surface of the test plate at an angle of 45° at such a pressure as the pencil lead is not broken, in this condition the pencil is moved by about 1 cm at a speed of 3 sec/cm, and in this way there is measured the hardness of the hardest pencil causing no scratch.

The top coating paint used in the process of this invention, is classified into (1) an enamel paint obtained by adding, to a paint using the above mentioned main vehicle component, metallic pigments and/or color pigments and (2) a clear paint completely or substantially free from these pigments. Using such a paint, a top coating film can be formed thermally according to, for example, the following methods.

(1) A metallic paint containing metallic pigments and, as necessary, color pigments or a solid color paint containing color pigments is applied and heat-cured. (Metallic or solid color finishing by one coating and one baking)

(2) A metallic paint or a solid color paint is applied and heat-cured. Then, a clear paint is applied and again heat-cured. (Metallic or solid color finishing by two coatings and two bakings)

(3) A metallic or a solid color paint is applied and then a clear paint is applied. Subsequently, the resulting two films are cured simultaneously. (Metallic or solid color finishing by two coatings and one bakings)

The top coating paints mentioned above are applied preferably by spray coating, electrostatic coating, etc. The resulting coating film is dried and/or cured by room temperature drying, heat drying, heat curing, crosslinking curing by irradiation of active energy rays (e.g. electron rays, ultra-violet rays), etc., depending upon the form, type, etc. of the paint applied.

The top coating film formed as above preferably has a thickness (as dried) of 25 to 40$\mu$ when the method (1) is used and 10 to 30$\mu$ (metallic and solid color paints) and 25 to 50$\mu$ (clear paint) when the method (2) or (3) is used. The heating condition of the top coating film can vary depending upon the type of vehicle component used. However, it is usually room temperature to 170° C., particularly 80° to 150° C.

The exact reason that the process of this invention can give excellent chipping resistance in the coating system onto the metallic member which may contain the plastic member at times is not clear. It is, however, presumably that because of the barrier coat film having viscoelasticity due to the olefin resin and the urethane resin, even if the top coated surface is given strong impact by pebbles, most of the impact energy is absorbed inside the barrier coat film and does not reach the under layer.

Regarding formation of a coating film onto a product being coated which has a metallic portion and a plastic portion, such as an automotive outer body, this invention solves a problem of disaccord in color of both the members. Although its reason is not fully clarified, "distortion" with the intermediate coating film that occurs by difference in physical properties of both the members, such as heat shrinkability and pliability, is absorbed in the barrier coat film by coating the aqueous barrier coat on both the members, so that the "distortion" is prevented from reaching the intermediate coating paint film and the top coating paint film, making it possible to coat the intermediate coating paint and the top coating paint of the same composition onto both the members.

Besides, as the barrier coat film acts to absorb the impact energy applied from outside, a coating film having excellent chipping resistance and rich in corrosion resistance can be provided. The function to absorb the impact energy and the "distortion" is considered to derive from viscoelasticity of the olefin or polyurethane resin component.

The reason that this invention improves top coat finishing properties, especially distinctness of image gloss compared to the application of the conventional barrier coat, is believed to be that solvent resistance of the barrier coat film improves by the conjoint use of the olefin component and the polyurethane component in comparison to the use of the olefin component alone. That is, according to this invention, a coated surface having excellent smoothness is provided without the barrier coat film being attacked by the intermediate coating paint or the top coating paint. Moreover, since the barrier coat according to this invention is an aqueous paint having a low content of an organic solvent, the ordinary level is much improved from the aspect of the preservation of environment.

Regarding the aqueous barrier coat, storage stability and top coat finishing properties are improved presumably because the aqueous dispersion of the urethane resin has a particle size of less than 0.1 micron and possesses a function to protect agglomeration of olefin particles by repulsion of charge of the particle surface.

As has been stated above, this invention markedly improves chipping resistance, rust-proofing property, corrosion resistance, finishing property and color matching property by forming the barrier coat film composed mainly of the aqueous product made of the olefin resin and the urethane resin between the layers of the electrodeposition coating film and the intermediate coating film. Storage stability of the conventional aqueous barrier coat can rapidly be improved.

The following Examples and Comparative Examples will illustrate this invention more specifically.

EXAMPLES

(1) Materials to be coated (A) A steel panel treated with a surface treating agent of zinc phosphate type (dimensions: 300 mm×90 mm×0.8 mm).
(B) A steel panel having an acute-angled portion obtained by bending the steel panel (A) by 90°.
(C) A polyamide resin panel degreased with trichloroethane vapor (dimensions: 300 mm×90 mm×0.8 m).

(2) Cationic electrodeposition coating paints

A paint using, as vehicle components, a polyamide-modified bisphenol type epoxy resin (acetic acid used as a neutralizing agent) and a blocked polyisocyanate compound. pH: 6.5 Solid content: 20% by weight.

(3) Aqueous barrier coat

An explanation is made first on Preparation Examples of emulsions (a-1) to (a-3), (b-1) and (b-2) and Preparation Examples of resin solutions (A-1), (A-2) and (B-1), and then on barrier coats (E-1) to (E-5).

By the way, parts and percentages are on the weight basis, unless otherwise indicated.

Preparation Example of Urethane Prepolymer (A-1)

Into a polymerization reactor was placed a starting material (NCO/OH=1.57) comprising 225 parts of polyester diol (I) having a number average molecular weight of about 2000, i.e., a condensation polymer of butanediol and adipic acid, 375 parts of polycaprolactone diol (II) having a number average molecular weight of about 2000, 26.6 parts of 1,4-cyclohexanedimethanol, 60.4 parts of dimethylolpropionic acid and 313 parts of isophorone diisocyanate. The material was heated to 50° C. with stirring in a nitrogen gas atmosphere, 0.05 part of dibutyltin oxide was then added to the material as a polymerization catalyst, and the material was thereafter reacted at 70° C. for 1 hour to obtain urethane prepolymer (A-1) having an NCO group at the terminal position and containing 3.8% of NCO groups. The polymer was about 2,150 in number average molecular weight.

Preparation Example of Urethane Resin Emulsion (a-1)

Into a reactor were placed 350 parts of urethane prepolymer (A-1), 115 parts of acetone and 35 parts of N-methylpyrrolidone, which were then made into a uniform solution at 50° C. With stirring, 14.5 parts of triethylamine was added to the solution, 550 parts of deionized water was added to the mixture as held at 50° C., and the mixture was continuously stirred for 2 hours to complete a chain lengthening reaction in the water. The mixture was distilled in a vacuum at a temperature of not higher than 80° C. to remove acetone until 115 parts of distillate was obtained, whereby 950 parts of urethane resin emulsion (a-1) was obtained which had a solids content of 37%. The resin was about 32,000 in number average molecular weight and 0.1 μm in mean particle size.

Preparation Example of Urethane Resin Solution (A-2)

Into a polymerization reactor was placed a starting material (NCO/OH=0.975) comprising 256 parts of polyester diol (I), 427 parts of polycaprolactone diol (II), 30 parts of 1,4-cyclohexanedimethanol, 68 parts of dimethylolpropionic acid and 219 parts of isophorone diisocyanate. The material was heated with stirring while introducing nitrogen gas into the reactor. Upon the temperature of the material reaching 50° C., 0.05 part of dibutyltin oxide was added to the material, followed by reaction at 80° C. for 4 hours. With the temperature thereafter lowered to 60° C., 50 parts of methanol was added to the reaction mixture to inactivate the unreacted NCO groups. Subsequently, 345 parts of acetone and 105 parts of N-methyl-vinylpyrrolidone were added to the mixture, followed by continued stirring until a uniform solution was obtained. Thus, urethane resin solution (A-2) was prepared which contained 67% of solids. The resin had a number average molecular weight of about 25,000.

Preparation Example of Urethane Resin Emulsion (a-2)

Into a reactor was placed 528.5 parts of urethane resin (A-2), 14.5 parts of triethylamine was added to the resin with stirring at 50° C., 620 parts of deionized water was further added slowly to the mixture as maintained at 50° C., and the resulting mixture was continuously stirred for 1 hour. The reaction mixture was then distilled in a vacuum at 70° C. to remove acetone and methanol until 139 parts of distillate was obtained, whereupon the distillation was discontinued, affording urethane resin emulsion (a-2) having a solids content of 35% and an organic solvent content of 14.6 PHR (Per Hundred Resin). The resin was 0.05 μm in mean particle size.

Preparation Example of Urethane Prepolymer (A-3)

Into a polymerization reactor was placed a starting material (NCO/OH=1.33) comprising 476 parts of polytetraoxymethylene glycol having a molecular weight of about 2000, 130 parts of "K-FLEX188" (a linear polyester having terminal cyclohexanedimethanol, product of KING Industries Inc. Co.) having a molecular weight of 435, 26 parts of 1,4-cyclohexane diisocyanate, 63 parts of dimethylolpropionic acid, 3.5 parts of glycerin, 184 parts of tolylene diisocyanate (TDI) and 117 parts of isophorone diisocyanate (IPDI). The same procedure as in Preparation Example of prepolymer (A-1) was then repeated to obtain urethane prepolymer (A-3) having an NCO end group in an NCO content of 3.1%.

Preparation Example of Urethane Resin Emulsion (a-3)

Urethane resin emulsion (a-3) having a solids content of 38% was prepared in the same manner as in Preparation Example of emulsion (a-1) except that urethane prepolymer (A-3) was used in place of prepolymer (A-1). The resin was about 43,000 in molecular weight and 0.07 μm in mean particle size.

Preparation Example of Olefin Resin Solution (B-1)

Into a reactor were placed 500 parts of maleinized chlorinated polypropylene (containing 25% of chlorine and 2.0% of maleic anhydride) having a number average molecular weight of about 10,000, 150 parts of n-heptane and 50 parts of N-methylvinylpyrrolidone, which were then stirred at 70° C. in a nitrogen atmosphere to prepare a uniform solution, i.e., olefin resin solution (B-1).

Preparation Example of Olefin Resin Solution (b-1)

Into a reactor was placed 700 parts of olefin resin solution (B-1). With the solution maintained at 50° C., 10.6 parts of triethylamine and 5 parts of "Noigen EA- 140" (polyethyleneglycol nonylphenyl ether, nonionic surfactant, HLB14, product of Dai-ichi Kogyo Seiyaku Co., Ltd.) were added to the solution, followed by stirring for 1 hour. Thereafter, 2,000 parts of deionized water was slowly added to the mixture, followed by stirring for 1 hour. The reaction mixture was subsequently distilled in a vacuum at 70° C. to remove n-heptane and water until 600 parts of distillate was obtained, giving olefin resin emulsion (b-1) having a solids content of 23.6%. The resin was 0.8 μm in mean particle size.

Preparation Example of Olefin Resin Solution (B-2)

Into a reactor were placed 700 parts of resin solution having a solids content of 50% and prepared by dissolving chlorinated polypropylene resin (about 5,800 in number average molecular weight ($\overline{M}n$) and 26% in chlorine content) in toluene, and 350 parts of butyl cellosolve, which were heated to 100° C. Subsequently added dropwise to the mixture over a period of three hours was a mixture of 52 parts of acrylic acid, 130 parts of styrene, 468 parts of n-butyl acrylate, 69 parts of a benzoyl peroxide paste containing 75% of an effective component and 50 parts of isopropanol. The resulting mixture was aged at the same temperature for 1 hour. Subsequently, a solution of 3.25 parts of azobisisovaleronitrile in 50 parts of butyl cellosolve was added dropwise to the mixture over a period of 1 hour. The mixture was maintained at the same temperature for 1 hour and then heated to an elevated temperature of 110° C. to remove the unreacted monomers, water, isopropanol and toluene in a vacuum, giving resin solution (B-2) having a solids content of 70% and a resin acid value of 40.5.

Preparation Example of Olefin Resin Emulsion (b-2)

Into a reactor was placed 1700 parts of olefin resin solution (B-2). While fully stirring the solution, dimethylethanolamine was added to the solution in an amount of 1.0 neutralization equivalent based on the carboxyl of the resin solution, and 2075 parts of deionized water was further added to obtain emulsion (b-2) having a solids content of 28.2% and an olefin resin/acrylic resin solids ratio of 35/65. The means resin particle size was 0.5 μm.

Barrier coat (E-1)

The urethane resin emulsion [(a-1): 208 parts) and 106 parts of the olefin resin emulsion (b-1) were well mixed in a stirring container at 25° C. to obtain a (a-1)/(b-1) mixed emulsion (c-1) having a solids content of 31.8% (a maleinized chlorinated olefin/urethane resin ratio=25/75) and an organic solvent content of 12.5 PHR. The emulsion [(c-1): 404 parts], 100 parts of titanium white and 0.3 part of a carbon pigment were well kneaded to obtain a barrier coat (E-1).

Barrier coat (E-2)

The urethane resin [(A-2): 120 parts] and 35 parts of the olefin resin solution (B 1) were charged into a reaction vessel. While keeping the inside of the system at 50° C. during stirring, 3.1 parts of triethylamine and 0.25 part of Noigen EA-140 were added. Stirring continued for 1 hour, and 127.4 parts of deionized water was further added over a period of 1 hour. Then, removal of the solvent was conducted at 70° C. under reduced pressure until the amounts of distilled materials (acetone and methanol) reached 29.6 g. There resulted an emulsion (c-2) having a nonvolatile content of 39.0% (a maleinized chlorinated polypropylene/polyurethane ratio=25/75) and an organic solvent content of 17.4 PHR. The emulsion [(c-2): 256 parts], 100 parts of titanium white and 0.3 part of a carbon pigment were thoroughly kneaded to obtain a barrier coat (E-2).

Barrier coat (E-3)

The urethane resin emulsion [(a-2): 214.2 parts] and 105.9 parts of the olefin resin emulsion (b-1) were well mixed in a stirring container at 25° C. to obtain a (a-2)/(b-1) mixed emulsion (c-3) having a solids content of 32.2% (a maleinized chlorinated polypropylene/urethane resin ratio=25/75) and an organic solvent content of 16 PHR. The emulsion [(c-3): 320 parts], 100 parts of titanium white and 0.3 part of a carbon pigment were well kneaded to obtain a barrier coat (E-3).

Barrier coat (E-4)

Seventy parts of a maleinized polyethylenepropylene copolymer resin containing 2% of maleic anhydride, having an ethylene/polypropylene ratio of 40 parts/60 parts and having a number average molecular weight of 30,000, 70 parts of N-methylvinylpyrrolidone and 70 parts of toluene were stirred in a reaction vessel at 100° C. for 1 hour to afford a uniform olefin resin solution (B-3). Subsequently, the temperature in the inside of the reaction vessel was lowered to 75° C. and stirring continued. Then, 280 parts of the urethane prepolymer (A-1) and 70 parts of methyl ethyl ketone were charged, and the mixture was neutralized with 14.5 parts of triethylamine. While keeping the temperature at 75° C., 700 parts of deionized water was added, and the reaction was run for 2 hours to complete the chain extending reaction. Methyl ethyl ketone was evaporated by vacuum distillation to afford an emulsion having a solids content of 29.3% (a maleinized ethylene-propylene copolymer/polyurethane resin ratio=20/80) and a solvent content of 39.5 PHR. The average particle size of the emulsion was 0.5 micrometer. Said emulsion (170.6 parts) and 131.5 parts of the urethane resin emulsion (a-3) were mixed, and 100 parts of titanium white and 0.3 part of a carbon pigment were then further well kneaded to obtain a barrier coat (E-4).

Barrier coat (E-5)

The emulsion [(b-3): 177.3 parts], 135.1 parts of the emulsion (a-1), 100 parts of titanium white and 0.3 part of a carbon pigment were well kneaded to obtain a barrier coat (E-5).

Paint (E-6)

The polyolefin resin emulsion [(b-1): 423.7 parts], 100 parts of titanium white and 0.4 part of a carbon pipment were well kneaded to obtain a paint (E-6).

Paint (E-7)

The polyolefin resin solution [(B-3): 420 parts] was well mixed with 3.0 parts of triethylamine, 3.0 parts of Noigen EA-150 (a trade name for polyethyleneglycol nonylphenyl ether made by Dai-ichi Kogyo Seiyaku Co., Ltd., nonionic surfactant, HLB15), and 280 parts of deionized water to provide an aqueous dispersion of the polyolefin resin (B-3). The particle size of the dispersion was 2.5 microns. The aqueous dispersion (504 parts), 100 parts of titanium white and 0.3 part of carbon were well kneaded to provide a paint (E-7).

Paint (E-8)

Polyoxytetramethylene glycol (PTG-500, a trade name for a product made by Hodogaya Chemical Co., Ltd.: 1020.0 parts) having an OH value of 55 was dehydrated in vacuo at 100° C. and 1 mmHg. Then, the temperature was lowered to 40° C., and 178.6 parts of tolylene diisocyanate was added, followed by the reaction at 85° C. for 3 hours. Subsequently, 49.9 parts of a half ester compound formed from 134.0 parts of trimethylolpropane and 98.0 parts of maleic anhydride and having an acid value of 233.8 was added to the polyurethane prepolymer, and the reaction was run under a nitrogen stream at 85° C. for 3 hours to obtain an isocyanate-terminated prepolymer containing a carboxyl group. The prepolymer was maintained at 85° C., poured into 1,534 parts of an aqueous solution containing 8.2 parts of sodium hydroxide under mixing with a homomixer, and emulsified to obtain a milk-white polyurethane emulsion having a solids content of 44.9%.

Said emulsion (222.7 parts), 100 parts of titanium white and 0.3 part of a carbon pigment were well kneaded to obtain a paint (E-8).

(E-1) to (E-8) were adjusted to a viscosity of 500 to 600 cps (measured by a B-type viscometer at 20° C.) with deionized water, and then coated.

Of (E-1) to (E-8), (E-6) to (E-8) are barrier coats for comparison.

(4) An intermediate coating paint: Amilac N-2 Sealer (an intermediate coating paint of amino polyester resin type manufactured by KANSAI PAINT CO., LTD)., pencil hardness at 20° C.: H (5) Top coating paints (A) Amilac white (a top coating paint of amino alkyd resin type manufactured by KANSAI PAINT CO., LTD., a white paint for one coating and one baking) Pencil hardness at 20° C.: H (B) Magicron Silver (a top coating paint of amino acryl resin type manufactured by KANSAI PAINT CO., LTD., a silver metallic paint for two coatings and one baking) Pencil hardness at 20° C.: H (C) Magicron Clear (a top coating paint of amino acryl resin type manufactured by KANSAI PAINT CO., LTD., a clear paint for two coatings and one baking) Pencil hardness at 20° C.: H (D): SOFLEX #1400 Silver Metallic (a trade name for a metallic paint for plastics made by Kansai Paint Co., Ltd., an amino polyester type)

(E): SOLFEX #500 Clear (a trade name for a clear paint for plastics made by Kansai Paint Co., Ltd., a urethane acryl type)

1) Using the above samples, the cationic electrodeposition coating paint, the barrier coat, the intermediate coating paint and the top coating paint were coated on a steel plate as shown in Table 1.

The resulting coated plate was tested for various properties, and the results are shown in Table 2.

TABLE 1

| | | Example | | | | | | | Comparative Example | | | | |
|---|---|---|---|---|---|---|---|---|---|---|---|---|---|
| | | 1 | 2 | 3 | 4 | 5 | 6 | 7 | 1 | 2 | 3 | 4 | 5 |
| Cationic electrodeposition coating | baking | 170° C., 30 min | | | | | | | | | | | |
| | film thickness | 20μ | | | | | | | | | | | |
| Barrier coating | type | E-1 | E-1 | E-1 | E-2 | E-3 | E-4 | E-5 | E-6 | E-7 | E-8 | | |
| | baking | 100° C. 10 min | 100° C. 10 min | 60° C. 30 min | 100° C. 10 min | 100° C. 10 min | 100° C. 10 min | 100° C. 10 min | 100° C. 10 min | 100° C. 10 min | 100° C. 10 min | | |
| | film thickness | 10μ | 10μ | 10μ | 10μ | 10μ | 10μ | 10μ | 10μ | 6μ | 10μ | | |
| Intermediate coating | baking | 140° C., 30 min | | | | | | | | | | | |
| | film thickness | 25μ | | | | | | | | | | | |
| Top coating | type | (A) | (B) | (A) | (B) | (A) | (A) | (B) | (A) | (B) | (A) | (A) | (B) |
| | baking | 140° C. 30 min | — | 140° C. 30 min | — | 140° C. 30 min | 140° C. 30 min | — | 140° C. 30 min | — | 140° C. 30 min | 140° C. 30 min | — |
| | film thickness | 35μ | 15μ | 35μ | 15μ | 35μ | 35μ | 15μ | 35μ | 15μ | 35μ | 35μ | 15μ |
| | type | | (C) | | (C) | | | (C) | | (C) | | | (C) |
| | baking | | 140° C. 30 min | | 140° C. 30 min | | | 140° C. 30 min | | 140° C. 30 min | | | 140° C. 30 min |
| | film thickness | | 35μ | | 35μ | | | 35μ | | 35μ | | | 35μ |

TABLE 2

| | | Example | | | | | | | Comparative Example | | | | |
|---|---|---|---|---|---|---|---|---|---|---|---|---|---|
| | | 1 | 2 | 3 | 4 | 5 | 6 | 7 | 1 | 2 | 3 | 4 | 5 |
| Performance of usual coating film | Distinctness of image gloss | 88 | 90 | 88 | 90 | 88 | 89 | 90 | 87 | 76 | 68 | 87 | 90 |
| | Impact resistance | normal | normal | normal | normal | normal | normal | normal | Break and peeling somewhat occur | normal | normal | Break and peeling somewhat occur | Break and peeling somewhat occur |
| | Adhesion | good | good | good | good | good | good | good | good | good | good | good | good |
| | Water resistance | normal | normal | normal | normal | normal | normal | normal | normal | normal | normal | normal | normal |
| Chipping resistance (I) | Condition of a coated surface | ⊙ | ⊙ | ⊙ | ⊙ | ⊙ | ⊙ | ⊙ | ⊙ | ⊙ | Δ | X | X |
| | Salt spray resistance | Rust never occurs | Rust never occurs | Rust never occurs | Rust never occurs | Rust never occurs | Rust never occurs | Rust never occurs | Rust somewhat occurs | Rust never occurs | Rust somewhat occurs | Rust heavily occurs | Rust heavily occurs |

TABLE 2-continued

| | | Example | | | | | | | Comparative Example | | | | |
|---|---|---|---|---|---|---|---|---|---|---|---|---|---|
| | | 1 | 2 | 3 | 4 | 5 | 6 | 7 | 1 | 2 | 3 | 4 | 5 |
| Chipping resistance (II) | Condition of a coated surface | ⊚ | ⊚ | ⊚ | ⊚ | ⊚ | ⊚ | ⊚ | X | X | Δ | | |
| | Salt spray resistance | Rust never occurs | Rust never occurs | Rust never occurs | Rust never occurs | Rust never occurs | Rust never occurs | Rust never occurs | Rust heavily occurs | Rust heavily occurs | Rust somewhat occurs | | |

Test methods:

1. Distinctness of image gloss

This property was measured by Image Clarity Meter (HA-ICH, a trade name for a machine manufactured by Suga Shikenki K.K.).

2. Impact resistance

This test was conducted in an atmosphere of 0° C. in accordance with JIS K 5400-1979 6.133B. A weight of 500 g was dropped from a height of 50 cm to examine the damage incurred on the coating film.

3. Adhesion

The coating film of a test panel was formed into 100 squares each of 1 mm × 1 mm in accordance with JIS K 5400-1979 6.15. Thereon was stuck an adhesive cellophane tape. The tape was subjected to rapid peeling and the number of remaining squares was counted.

4. Water resistance

A test panel was immersed in water of 40° C. for 10 days and the film surface was evaluated.

5. Chipping resistance (I)

(1) Gravel testing machine: Q-G-R Gravelometer manufactured by Q Panel Co.

(2) Stones to be blown: Crushed stones having diameters of about 15 to 20 mm.

(3) Volume of stones to be blown: About 500 ml.

(4) Blowing air pressure: About 4 kg/cm$^2$.

(5) Test temperature: About 20° C.

A test panel was fixed to a support panel. About 500 ml of crushed stones were allowed to hit the test panel using a blowing air pressure of about 4 kg/cm$^2$. Thereafter the test panel was tested for film surface condition and salt water spray resistance. Film surface condition was examined visually and evaluated based on the criteria given below. In the test of salt water spray resistance, a test panel after having been hit by the curshed stones was subjected to a salt water spray test by JIS Z 2371 for 240 hr; and the state of subsequent rust development, condition of corrosion, peeling of coating film, etc. at the hit portions were observed.

Evaluation criteria (1) Film surface condition

⊚: Craking by hitting is recognizable very slightly at the limited places of a top coating film. There is no peeling of an electrocoating film.

○: Craking by hitting is recognizable in places of a top coating film and peelingof the electrocoating film is seen at less numbers of places.

Δ: Top coating peeled off at many places and peeling of electrocoated film occured at a minor degree.

X: The greatest part of the top coating film peels off. An electrocoating film peels off at the hit portions and their surrounding areas.

Chipping resistance—II

Coated plates prepared by using the barrier coats (E-1) to (E-5) and the paints (E-6) to (E-8) which were stored at 20° C. for 1 month were subjected to the same test of the chipping property-I, and evaluated with the same criteria.

(2) The cationic electrodeposition coating paint was coated on the above metallic member in a usual manner, and cured by heating at 170° C. for 30 minutes (a thickness of the cured coating film 20 microns).

Then, a product (being coated) composed of a combination of the metallic member having coated thereon the cationic electrodeposition coating paint and the plastic member was coated with the barrier coat by an air spray and with the intermediate coating paint and the top coating paint by electrostatic coating as shown in Table 3.

In Table 3:

(1) The film thickness is all measured on the basis of the dried cured coating film.

(2) The top coating in Examples 9, 11 and 13 and Comparative Examples 7, 9 and 10 is all a two-coat one-bake system by wet-on-wet coating. After the top coating paint (B) or (D) was coated, it was left to stand at room temperature for 15 minutes, and the top coating paint (C) or (E) was then coated thereon, followed by baking.

(3) In Examples 8 to 13 and Comparative Examples 6 to 8 and 10, a single barrier coat, a single intermediate coating paint and a single top coating paint were coted on both sides of the metallic member and the plastic member. In Comparative Example 9, the cationic electrodeposition coating paint, the intermediate coating paint and the top coating paints (B) and (C) were coated on the metallic member, and the paints (D) and (E) were coated on the plastic member.

The coated plates obtained in the above Examples and Comparative Examples were subjected to the coating film performance test. The results are shown in Table 4.

TABLE 3

| | | Example | | | | | | Comparative Example | | | |
|---|---|---|---|---|---|---|---|---|---|---|---|
| | | 8 | 9 | 10 | 11 | 12 | 13 | 6 | 7 | 8 | 9 | 10 |
| Cationic electrodeposition | baking | 170° C., 30 min | | | | | | | | | |
| | film thickness | 20μ | | | | | | | | | |

TABLE 3-continued

|  |  | Example 8 | Example 9 | Example 10 | Example 11 | Example 12 | Example 13 | Comp. Ex. 6 | Comp. Ex. 7 | Comp. Ex. 8 | Comp. Ex. 9 | Comp. Ex. 10 |
|---|---|---|---|---|---|---|---|---|---|---|---|---|
| coating |  |  |  |  |  |  |  |  |  |  |  |  |
| Barrier coating | type | E-1 | E-2 | E-3 | E-4 | E-5 | E-1 | E-6 | E-7 | E-8 |  |  |
|  | baking | 100° C. 10 min | 100° C. 10 min | 100° C. 10 min | 100° C. 10 min | 100° C. 10 min | 80° C. 30 min | 100° C. 10 min | 100° C. 10 min | 100° C. 10 min |  |  |
|  | film thickness | 10μ | 10μ | 10μ | 10μ | 10μ | 10μ | 10μ | 10μ | 6μ |  |  |
| Intermediate coating | baking film thickness |  |  |  |  | 140° C., 30 min 25μ |  |  |  |  |  |  |
| Top coating | type | A | B | A | B | A | B | A | B | A | B, D | B |
|  | baking | 140° C. 30 min | — | 140° C. 30 min | — | 140° C. 30 min | — | 140° C. 30 min | — | 140° C. 30 min | — | — |
|  | film thickness | 35μ | 15μ | 35μ | 15μ | 35μ | 15μ | 35μ | 15μ | 35μ | 15μ | 15μ |
|  | type |  | C |  | C |  | C |  | C |  | C, E | C |
|  | baking |  | 140° C. 30 min |  | 140° C. 30 min |  | 140° C. 30 min |  | 140° C. 30 min |  | 140° C. 30 min | 140° C. 30 min |
|  | film thickness |  | 35μ |  | 35μ |  | 35μ |  | 35μ |  | 35μ | 35μ |

TABLE 4

|  |  |  | Example 8 | Example 9 | Example 10 | Example 11 | Example 12 | Example 13 | Comp. Ex. 6 | Comp. Ex. 7 | Comp. Ex. 8 | Comp. Ex. 9 | Comp. Ex. 10 |
|---|---|---|---|---|---|---|---|---|---|---|---|---|---|
| Performance of a coating film | Distinctness of image gloss (*1) | P | 82 | 78 | 81 | 79 | 82 | 79 | 60 | 70 | 55 | 77 | 78 |
|  |  | M | 82 | 78 | 80 | 78 | 82 | 78 | 58 | 71 | 60 | 76 | 79 |
|  | Impact resistance (*2) | P | normal | normal | normal | normal | normal | normal | Break and peeling somewhat occur | Break and peeling somewhat occur | normal | Break and peeling somewhat occur | Break and peeling somewhat occur |
|  |  | M | normal | normal | normal | normal | normal | normal | Break and peeling somewhat occur | Break and peeling somewhat occur | normal | Break and peeling somewhat occur | Break and peeling somewhat occur |
| Chipping resistance (*3) | Condition of a coated surface | P | ⊙ | ⊙ | ⊙ | ⊙ | ⊙ | ⊙ | Δ | Δ | ⊙ | Δ | X |
|  |  | M | ⊙ | ⊙ | ⊙ | ⊙ | ⊙ | ⊙ | X | Δ | ⊙ | ⊙ | X |
|  | Salt Spray resistance | M | Rust never occurs | Rust never occurs | Rust never occurs | Rust never occurs | Rust never occurs | Rust never occurs | Rust heavily occurs | Rust somewhat occurs | Rust never occurs | Rust heavily occurs | Rust heavily occurs |
| Color difference (*4) |  |  | ⊙ | ⊙ | ⊙ | ⊙ | ⊙ | ⊙ | ⊙ | ⊙ | ○ | 3.5 | ○ |
| Organic solvent content (*5) |  |  | 15 | 20 | 16 | 35 | 30 |  | 20 | 200 | 1,250 |  |  |

The performance test methods in (*1) to (*3) in Table 4 are the same as above.

Color difference (*4):
A color difference between the metallic member and the plastic member was measured according to JIS Z8730.

In the table, M is a performance of the coating film formed on the metallic member, and P is that of the coating film formed on the plastic member.

Organic solvent content (*5):
A theoretical value of an amount of an organic solvent contained in the barrier coat paint subjected to spray was calculated per 100 parts by weight of the resin solids content.

What is claim is:

1. A process for coating a surface of a substrate containing a metallic member, which comprises applying an aqueous barrier coat consisting essentially of an olefin resin and a carboxyl-containing urethane resin having an acid value of 25 to 150 on the substrate composed of a metallic member coated with a cationic electrodeposition coating paint or a combination of the coated metallic member and a plastic member; and then applying thereon a top coating paint.

2. The process of claim 1 wherein the cationic electrodeposition coating paint is a thermosetting cathodic electrodeposition coating paint obtained by neutralizing a base resin having basic amino groups with an acid and dissolving or dispersing the resulting resin in water.

3. The process of claim 1 wherein the cationic electrodeposition coating paint contains, as a curing agent, an epoxy resin having at least 2 epoxy functional groups each of which comprises an epoxy group directly bound to an alicyclic ring and/or a bridged alicyclic ring on average per molecule.

4. The process of claim 1 wherein the plastic member is subjected to a preliminary surface treatment selected from degreasing with solvent vapor, grinding, acid treatment and corona discharge treatment.

5. The process of claim 1 wherein the olefin resin is a homo- or co-polymer consisting essentially of an olefin monomer, a diene monomer or a mixture thereof.

6. The process of claim 1 wherein the olefin resin is selected from a propylene-ethylene copolymer, chlorinated polypropylene, EPDM (ethylene-propylene-diene copolymer), polybutadiene, a styrene-butadiene copolymer and an acrylonitrile-butadiene copolymer.

7. The process of claim 1 wherein the olefin resin is a modified acid group-containing polyolefin obtained by modifying a homo- or co-polymer consisting essentially of an olefin monomer a diene monomer or a mixture thereof with a carboxyl-containing polymerizable unsaturated monomer.

8. The process of claim 7 wherein the carboxyl containing polymerizable unsaturated monomer is selected from maleic acid, maleic anhydride, acrylic acid and methacrylic acid.

9. The process of claim 1 wherein the olefin resin has a number average molecular weight of about 3,000 to about 50,000.

10. The process of claim 9 wherein the olefin resin has a number average molecular weight of about 10,000 to about 30,000.

11. The process of claim 1 wherein the urethane resin is a urethane polymer obtained by reacting an active hydrogen-containing compound having at least two active hydrogen atoms in a molecule on average with a polyisocyanate compound, or a urethane polymer obtained by reacting the active hydrogen-containing compound with the polyisocyanate compound to form an isocyanate-terminating prepolymer, and then reacting the prepolymer with a chain-extending agent.

12. The process of claim 11 wherein the active hydrogen-containing compound is a diol.

13. The process of claim 11 wherein the polyisocyanate compound is selected from alicyclic diisocyanates and aromatic diisocyanates.

14. The process of claim 1 wherein the urethane resin has a number average molecular weight of about 10,000 to about 100,000.

15. The process of claim 14 wherein the urethane resin has a number average molecular weight of about 20,000 to about 50,000.

16. The process of claim 1 wherein the urethane resin is a carboxyl-containing urethane polymer.

17. The process of claim 1 wherein the aqueous barrier coat is 5 to 40% by weight of the olefin resin and 95 to 60% by weight of the urethane resin based on the total solids content of both the resins.

18. The process of claim 17 wherein the aqueous barrier coat is 10 to 30% by weight of the olefin resin and 90 to 70% by weight of the urethane resin based on the total solids content of both the resins.

19. The process of claim 1 wherein the film formed by the barrier coat has a thickness of 5 to 50 microns as a dried film.

20. The process of claim 1 wherein an intermediate coating paint is applied.

21. The process of claim 20 wherein the intermediate coating paint is an organic solvent or aqueous based thermosetting intermediate coating paint containing, as a vehicle main component, a combination of (1) a short oil or ultra-short oil alkyd resin having an oil length of 30% or less and/or an oil-free polyester resin and (2) an amino resin, and said intermediate coating paint is applied after the aqueous barrier coat and before the top coating paint.

22. The process of claim 20 wherein a cured film formed from the intermediate coating paint has a pencil hardness of 3B to 2H at 20° C.

23. The process of claim 20 wherein the film formed by the intermediate coating film has a thickness of 10 to 100 microns as a cured film.

24. The process of claim 1 wherein the top coating paint is a top coating paint of an amino acryl resin or an amino alkyd resin.

25. The process of claim 1 wherein the top coating paint is directly applied to the barrier coat film.

26. The process of claim 1 wherein the barrier coat further contains at least one deterioration inhibitor for resins, selected from ultraviolet absorbers, photostabilizers and antioxidants.

27. The process of claim 1 wherein an intermediate coating paint is applied on the barrier coat before applying the top coat.

28. A process wherein the barrier coat for coating a surface of a substrate containing a metallic member, which comprises applying an aqueous barrier coat consisting essentially of an olefin resin, a carboxyl-containing urethane resin having an acid value of 25 to 150, and an electroconductive material in an amount necessary to make a volume resistivity of the coated film 17 cm or less on the substrate composed of a metallic member coated with a cationic electrodeposition coating paint or a combination of the coated metallic member and a plastic member; and then applying thereon a top coating paint.

* * * * *